US005261714A

United States Patent [19]

Slusar et al.

[11] Patent Number: 5,261,714

[45] Date of Patent: Nov. 16, 1993

[54] ELECTROMAGNETIC PICKUP TOOL

[76] Inventors: Randall J. Slusar, 9821 W. Waterford Ave., Greenfield, Wis. 53228; Ronald O. Majors, 4719 63rd St., Kenosha, Wis. 53142; Jeffrey R. Annis, 1650 Haymarket Rd., Waukesha, Wis. 53186

[21] Appl. No.: 875,342

[22] Filed: Apr. 29, 1992

[51] Int. Cl.[5] .............................................. B25J 15/06

[52] U.S. Cl. .................................................. 294/65.5

[58] Field of Search ....... 294/65.5; 335/285, 289–291, 335/293, 294, 297, 299

[56] References Cited

U.S. PATENT DOCUMENTS

| | | | |
|---|---|---|---|
| 974,760 | 11/1910 | Eastwood . | |
| 1,094,106 | 4/1914 | White . | |
| 1,589,678 | 6/1926 | Bornemann | 294/65.5 |
| 1,680,599 | 8/1928 | Edson | 294/65.5 |
| 1,772,126 | 8/1930 | Barry | 294/65.5 X |
| 1,787,922 | 1/1931 | Webb | 294/65.5 |
| 1,831,280 | 11/1931 | Wright et al. . | |
| 1,903,154 | 3/1933 | Wullert et al. | 294/65.5 |
| 1,908,260 | 5/1933 | Koch et al. | 294/65.5 |
| 2,092,316 | 9/1937 | Lane . | |
| 2,469,056 | 5/1949 | Scripture | 294/65.5 X |
| 2,517,325 | 8/1950 | Lamb . | |
| 3,277,415 | 10/1966 | Spodig . | |
| 3,582,638 | 6/1971 | Peters . | |
| 3,924,115 | 12/1975 | Hampton et al. . | |
| 4,162,471 | 7/1979 | Peace et al. . | |
| 4,253,697 | 3/1981 | Acosta . | |
| 4,813,729 | 3/1989 | Speckhart . | |

FOREIGN PATENT DOCUMENTS

| | | | |
|---|---|---|---|
| 2254 | of 1896 | United Kingdom | 294/65.5 |
| 30203 | of 1911 | United Kingdom | 294/65.5 |

*Primary Examiner*—Johnny D. Cherry

[57] ABSTRACT

A magnetic pickup tool includes an elongated, flexible, tubular, conductive shaft connected to a handle at one end and to an electromagnet at the other end. The handle is an electrically conductive tube housing batteries and a push-button switch for connecting one battery terminal to the housing, the other battery terminal being connected to an insulated conductor which runs through the shaft for connection to one terminal of the electromagnet, which is provided with telescoping inner and outer pole pieces. A first tubular metal coupler electrically connects the handle to the shaft. A second metal tubular coupler has a diametrically slotted end which is received telescopically between the electromagnet pole pieces in contact with each, the electromagnet coil terminals being accommodated in the slot, the other end of the connector telescopically receiving the adjacent end of the shaft in contact therewith. A conductive potting connects the other terminal of the electromagnet to the tubular connector, while insulating potting fills the remainder of the slot and insulates the wire conductor and the one terminal of the electromagnet from the pole pieces and from the tubular connector.

19 Claims, 1 Drawing Sheet

ELECTROMAGNETIC PICKUP TOOL

BACKGROUND OF THE INVENTION

1. Field of the Invention

The present invention relates to magnetic pickup tools of the type used for picking up magnetizable objects, such as screws, nuts and the like, from relatively inaccessible locations.

2. Description of the Prior Art

It is known to provide various types of magnetic pickup tools for picking up magnetizable objects from relatively inaccessible places. For example, if a screw or nut is dropped in a difficult-to-reach place, elongated magnetic tools are frequently used for accessing the dropped part and magnetically adhering it to the tool for retrieval. One such type of tool includes an elongated, flexible shaft, having a handle at one end and provided with a magnet at the other end. The magnet may be a permanent magnet or it may be an electromagnet, powered by suitable power supply means, such as batteries, which may be contained in the handle of the tool.

One difficulty with such prior pickup tools is that the magnet may generate flux lines which extend laterally from the axis of the tool. Thus, if the tool is being used in a location, such as in an automotive vehicle engine compartment or the like, with metallic walls or partitions, the magnet tends to be attracted to the metal walls or partitions, making it very difficult to reach the object to be retrieved.

It is known to provide electromagnetic devices with conductive sleeves or outer pole pieces to provide a magnetic path for the flux lines, thereby concentrating the flux lines at a desired location, such as at the tip of the device. However, such an arrangement has not heretofore been satisfactorily provided in portable electromagnetic pickup tools.

SUMMARY OF THE INVENTION

It is a general object of the invention to provide an improved magnetic pickup tool which avoids the disadvantages of prior tools while affording additional structural and operating advantages.

An important feature of the invention is the provision of an electromagnetic pickup tool which effectively prevents magnetic flux lines from extending laterally of the axis of the tool and concentrates them in a direction axially of the tool.

In connection with the foregoing feature, another feature of the invention is the provision of a pickup tool of the type set forth, which provides unique coupling means for mounting the electromagnet on an elongated flexible shaft.

Another feature of the invention is the provision of a pickup tool of the type set forth, which is battery-powered, wherein the shaft and the handle of the tool provide a part of the electrical circuit for the electromagent.

Still another feature of the invention is the provision of a pickup tool of the type set forth, which provides a magnetic path between the pole pieces of the electromagnet and an electrical path between one terminal of the electromagnet and the shaft, while at the same time electrically insulating the other electromagnet terminal from the pole pieces and the shaft.

Still another feature of the invention is the provision of a pickup tool of the type set forth, which is of relatively simple and economical construction.

These and other features of the invention are attained by providing a portable magnetic pickup tool comprising: an elongated shaft having a handle end and a working end and a longitudinal axis extending therebetween, magnetic means carried by the shaft at its working end for generating a magnetic field which extends therefrom substantially only axially of the shaft, the magnetic means including spaced-apart inner and outer magnetic pole pieces disposed one within the other, and coupling means interconnecting the magnetic means and the shaft, the coupling means including means retaining the pole pieces and providing an electromagnetic path therebetween.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figures 1, 2, 3, 4, 5, 6:
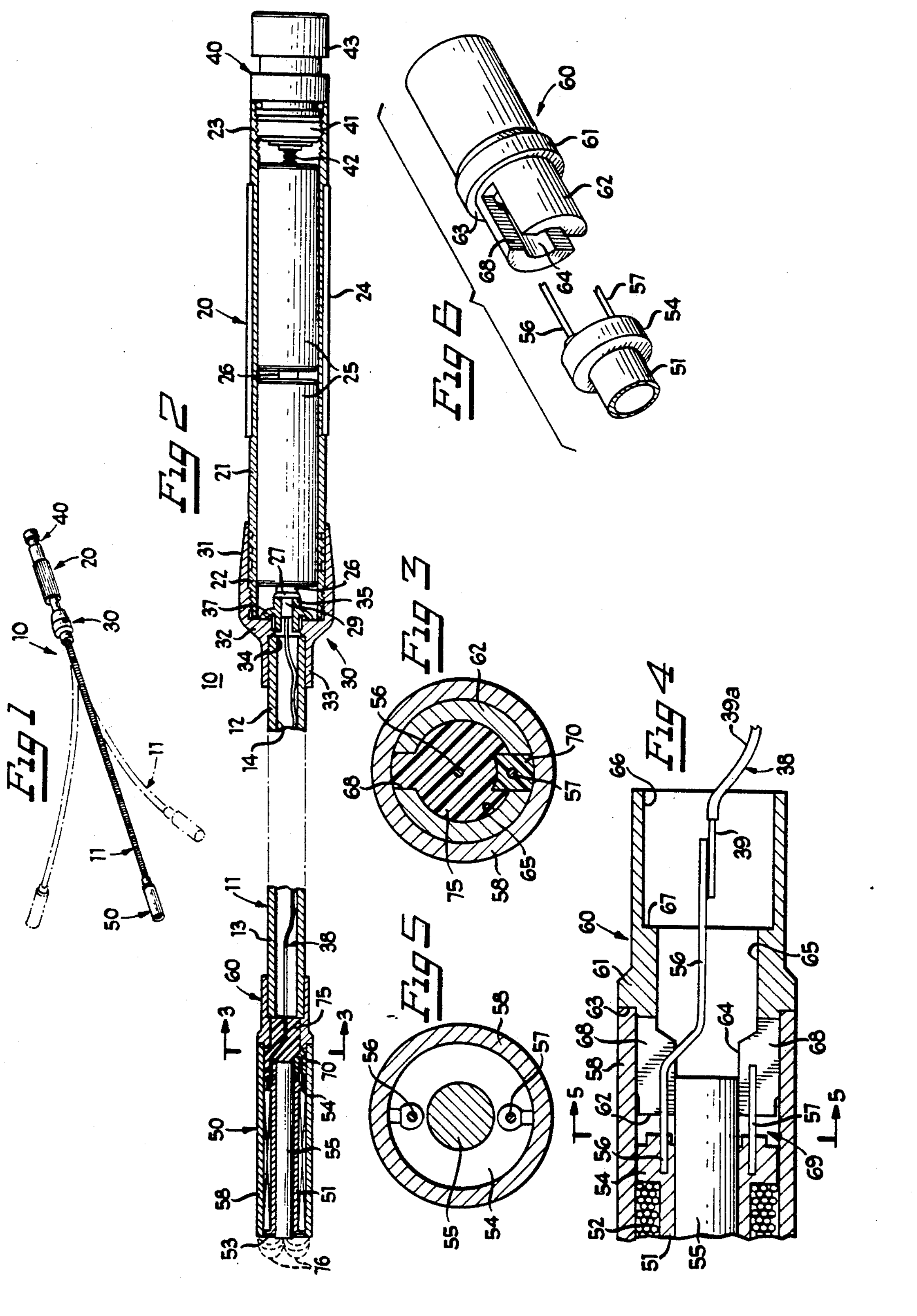
FIG. 1 is a perspective view of an electromagnetic pickup tool constructed in accordance with and embodying the features of the present invention.
FIG. 2 is an enlarged view of the tool of FIG. 1, in partial side elevation and in partial vertical section, with portions broken away.
FIG. 3 is a further enlarged sectional view taken along the line 3—3 in FIG. 2.
FIG. 4 is a further enlarged fragmentary view of the cooperation between the electromagnet and the coupler of FIG. 1, with potting removed.
FIG. 5 is a sectional view taken along the line 5—5 in FIG. 4.
FIG. 6 is a reduced, fragmentary, exploded, perspective view of the electromagnet spool and coupler of FIG. 4.

Referring to FIGS. 1 and 2, there is illustrated an electromagnetic pickup tool, generally designated by the numeral 10, constructed in accordance with and embodying the features of the present invention. The tool 10 has an elongated, flexible, tubular metallic shaft 11 having a handle end 12 and a working end 13 and defining a cylindrical bore 14 extending axially therethrough. The handle end 12 of the shaft 11 is coupled to a handle assembly 20, while the working end 13 is coupled to an electromagnet 50.

The handle assembly 20 includes an elongated, electrically conductive, tubular housing 21 with an externally threaded end 22 and an internally threaded end 23, and provided intermediate its ends with an encircling frictional grip sleeve 24, preferably formed of an electrically insulating material. Disposed within the housing 21 are two series-connected batteries 25, preferably "AA" batteries, having positive terminals 26. The forwardmost battery 25 has its positive terminal 26 disposed in electrical contact with a flange 27 of a tubular metal eyelet 29.

The handle assembly 20 is coupled to the shaft 11 by a cylindrical, metallic coupling 30, which has a large-diameter portion 31 at one end thereof which is internally threaded and receives telescopically therein the externally threaded end 22 of the handle housing 21 in threaded engagement therewith. The large diameter portion 31 of the coupling 30 is connected by an annular central portion 32 to a small-diameter portion 33 which telescopically receives therein the handle end 12 of the shaft 11, the small diameter portion 33 preferably being crimped into firm engagement and electrical contact with the shaft 11. The coupling 30 has an axial bore 34 therethrough, in the central portion of which is seated a tubular electrical insulator 35 having a radially outwardly extending annular flange 37 which is engageable with the central portion 32 of the coupling 30. The insulator 35 receives coaxially therein the cylindrical eyelet 29 for supporting same. The eyelet 29 is electrically connected, as by soldering or the like, to one end of an elongated insulated wire 38, which includes a conductor 39, such as braided conductor, surrounded by an electrically insulating sheath 39*a*, the wire 38 extending through the shaft 11 the entire length thereof (see FIG. 4).

Thus, it will be appreciated that the batteries 25 are electrically connected to the wire 38 by the eyelet 29, and the handle housing 21 is electrically connected to the shaft 11 by the coupler 30, but the eyelet 29 and the wire 38 are electrically insulated from the coupler 30 and from the shaft 11 by the insulator 35 and by the insulating sheath 39*a* of the wire 38.

The handle assembly 20 also includes a push-button switch assembly 40 which has an electrically conductive and externally-threaded body 41 which is threadedly engaged in the internally-threaded end 23 of the handle housing 21. The switch assembly 40 is provided with a spring contact 42 which electrically contacts the negative terminal of the rearmost one of the batteries 25, and resiliently urges the batteries 25 into firm engagement with the flange 27 of the eyelet 29. A push-button movable contact 43 selectively interconnects the conductive body 41 with the spring contact 42, in a known manner.

Referring now also to FIGS. 3-6, the electromagnet 50 includes a cylindrical, electrically insulating spool 51 on which is wound an electromagnetic coil 52, the spool 51 having an annular front end wall 53 and an annular rear end wall 54 (FIGS. 2, 4 and 6) for confining the coil 52. Telescopically disposed within the spool 51 and extending therethrouqh is a cylindrical core or inner pole piece 55, formed of a suitable magnetizable metal, such as steel. The front end of the core 55 is flush with or slightly forward of the front end of the spool 51, while the rear end of the core 55 is disposed a predetermined distance rearwardly of the rear end of the spool 51. The coil 52 has an elongated insulated terminal 56 and a shorter bare terminal 57 connected to opposite ends of the coil 52 (connection not shown) and projecting rearwardly from the end wall 54 of the spool 51 at diametrically opposed locations thereon. A cylindrical sleeve or outer pole piece 58, formed of a suitable magnetizable metal such as steel, encircles the spool 51 and has a front end flush with the front end of the core 55 and a rear end disposed a predetermined distance rearwardly of the rear end of the core 55.

It is a significant aspect of the present invention that the electromagnet 50 is coupled to and supported on the shaft 11 by a coupler 60. The coupler 60 has a cylindrical metal body 61 with a reduced-diameter forward end 62 terminating at an annular shoulder 63 and having an axial bore 64 therethrough. The central part of the body 61 has a larger-diameter counterbore 65 and the rearward end has a still larger-diameter counterbore 66 (FIG. 4), the counterbores 65 and 66 being separated by an annular shoulder 67. The reduced-diameter forward end 62 has a slot 68 extending diametrically therethrough and extending axially from the distal end of the coupler 60 to just short of the shoulder 63.

In assembly, the forward end 62 of the coupler 60 is fitted into the rear end of the electromagnet 50, telescopically between the inner and outer pole pieces 55 and 58, in press-fitted engagement with each, the coupler 60 being inserted into the electromagnet 50 until the outer pole piece 58 seats against the shoulder 63 (see FIG. 4). In this regard, the length of the reduced-diameter forward end 62 of the coupler 60 is such that it preferably terminates short of the rear end wall 54 of the electromagnet spool 51, cooperating therewith and with the outer pole piece 58 to define an annular cavity 69 around the inner pole piece 55. An electrically conductive potting 70 (see FIGS. 2 and 3) is then laid in the bottom of the cavity 69 and the slot 68 in surrounding relationship with the short terminal 57 of the electromagnet coil 52, providing an electrical connection between the terminal 57 and the coupler 60. The conductive potting 70 is circumferentially confined to the slot 68 and is radially confined to a region radially outwardly of the inner pole piece 55, so as to ensure that it will not come in contact with the terminal 56 and thereby short the coil 52.

The terminal 56 extends rearwardly into the upper part of the slot 68 and rearwardly of the end of the inner pole piece 55, where it is bent down to follow the axis of the coupler 60. The remainder of the cavity 69, the slot 68 and the bores 64 and 65 through the coupler 60 are then filled with an electrically insulating potting 75 (FIGS. 2 and 3), which further insulates the terminal 56 from the coupler 60, rigidly supports the terminal 56, and also serves to secure the electromagnet 50 to the coupler 60.

A stripped forward end of the wire 38 is then soldered to the stripped end of the terminal 56 and the rearward end of the coupler 60 is telescopically fitted over the working end 13 of the shaft until the shaft seats against the shoulder 67. The coupler 60 is then crimped into engagement with the shaft 11. An insulating heat shrink tubing (not shown) may be provided around the soldered connection between the wire 38 and the terminal 56.

It will be appreciated that the coupler 60 serves to fixedly retain the inner and outer pole pieces 55 and 58 in place, while providing an electromagnetic path therebetween, and also serves, in cooperation with the potting 75, fixedly to secure the electromagnet 50 to the shaft 11. The outer pole piece 58 serves to confine and concentrate the magnetic flux lines to the outer diameter of the pole piece 58. Thus, the flux lines 76 will be concentrated at the tip of the electromagnet 50 and will project therefrom substantially only axially, as indicated in FIG. 2. Accordingly, the electromagnet 50 will not tend to attach itself to surrounding metallic objects, and the magnetic field can effectively be focused on the object of interest.

Another significant aspect of the invention is that it requires only a single conductor wire 38 for connecting the batteries 25 to the electromagnetic coil 52, the return path being provided through the electrically conducting potting 70, the coupler 60, the shaft 11, the coupling 30, the handle housing 21 and the push-button switch assembly 40.

From the foregoing, it can be seen that there has been provided an improved magnetic pickup device, which effectively couples an electromagnet to an elongated flexible shaft, wherein the electromagnet is provided with inner and outer pole pieces for concentrating the electromagnetic field at its tip, the coupling serving to position the pole pieces while providing an electromagnetic path therebetween. A unique coupling is also provided to a battery power source and a handle assembly, requiring only a single wire connection between the batteries and the electromagnet.

We claim:

1. A portable magnetic pickup tool comprising: an elongated electrically conductive shaft having a handle end and a working end and a longitudinal axis extending therebetween, magnetic means carried by said shaft at its working end for generating a magnetic field which extends therefrom substantially only axially of the shaft, said magnetic means including spaced-apart inner and outer magnetic pole pieces disposed one within the other and an electromagnetic coil disposed between said inner and outer pole pieces and having two terminals, coupling means interconnecting said magnetic means and said shaft, said coupling means including means retaining said pole pieces relative to said shaft and providing an electromagnetic path between said pole pieces, said coupling means including means electrically connecting one of said terminals to said shaft and means electrically connecting said shaft and the other of said terminals to an associated source of electrical power.

2. The tool of claim 1, wherein said coupling means includes an electrically and magnetically conductive tubular member received telescopically between said inner and outer pole pieces in contact with each, said tubular member having a slot extending diametrically therethrough, said terminals being disposed in said slot.

3. The tool of claim 2, and further comprising means electrically insulating one of said terminals from said pole pieces and from said tubular member and from said shaft, and means electrically connecting the other of said terminals to said tubular member.

4. The tool of claim 3, and further comprising electrically insulating potting means disposed in said slot and electrically insulating said one terminal of said electromagnetic coil from said pole pieces and from said tubular member.

5. The tool of claim 4, and further comprising electrically conductive potting means providing electrical connection between the other of said electromagnet terminals and said tubular member.

6. The tool of claim 4, wherein said electrically insulating potting means bonds said tubular member to said pole pieces.

7. The tool of claim 2, wherein the source of power includes a battery.

8. A portable magnetic pickup tool comprising: an elongated electrically conductive tubular shaft having a handle end and a working end and a longitudinal axis extending therebetween, an elongated wire conductor extending through said shaft, means electrically insulating said wire conductor from said shaft, a cylindrical electromagnet having two terminals, one of which is electrically connected to said wire conductor at the working end of said shaft, first coupling means supporting said electromagnet on said shaft at its working end and providing electrical connection between said shaft and the other of said terminals, handle means, power supply means disposed in said handle means and having two terminals, and second coupling means coupling said handle means to said shaft, said second coupling means including first conductive means providing electrical connection between said wire conductor and one of said power supply means terminals, and second conductive means cooperating with said handle means to provide electrical connection between said shaft and the other of said power supply means terminals.

9. The tool of claim 8, wherein said shaft is flexible.

10. The tool of claim 8, wherein said power supply means includes battery means.

11. The tool of claim 8, wherein said second coupling means includes an electrically conductive tubular connector disposed in telescoping contact with said handle end of said shaft and with said handle means for providing electrical connection therebetween.

12. The tool of claim 11, wherein said first conductive means is disposed coaxially within said tubular connector, and further comprising means electrically insulating said first conductive means from said tubular connector.

13. The tool of claim 8, and further comprising switch means for selectively connecting said power supply means to said electromagnet.

14. A portable magnetic pickup tool comprising: an elongated electrically conductive tubular shaft having a handle end and a working end and a longitudinal axis extending therebetween, an elongated wire conductor extending through said shaft, means electrically insulating said wire conductor from said shaft, a cylindrical electromagnet including inner and outer magnetic pole pieces disposed one within the other and spaced apart by an electromagnetic coil having two terminals, one of which is electrically connected to said wire conductor at the working end of said shaft, first coupling means supporting said electromagnet on said shaft at its working end and providing electrical connection between said shaft and the other of said terminals, said first coupling means including a tubular member having a slot extending diametrically therethrough, said coil terminals being disposed in said slot, power supply means having two terminals, one of which is electrically connected to said wire conductor at the handle end of said shaft, and second coupling means coupling said power supply means to said shaft and providing electrical connection between said shaft and the other of said power supply means terminals.

15. The tool of claim 14, wherein said shaft is flexible.

16. The tool of claim 14, wherein said tubular member is electrically and magnetically conductive and is disposed telescopically between said inner and outer pole pieces in contact with each.

17. The tool of claim 16, and further comprising electrically insulating potting means disposed in said slot and electrically insulating said one terminal of said coil from said pole pieces and from said tubular member.

18. The tool of claim 17, and further comprising electrically conductive potting means providing electrical connection between the other of said coil terminals and said tubular member.

19. The tool of claim 14, wherein the power supply means includes battery means, and said second coupling means includes an electrically conductive tubular handle housing said battery means, and switch means selectively connecting said tubular handle housing to the other of said power supply terminals.

* * * * *

UNITED STATES PATENT AND TRADEMARK OFFICE
CERTIFICATE OF CORRECTION

PATENT NO. : 5,261,714

DATED : November 16, 1993

INVENTOR(S) : Randall J. Slusar et al.

It is certified that error appears in the above-indentified patent and that said Letters Patent is hereby corrected as shown below:

On the title page;

[73] Assignee should be --Snap-on Tools Corporation, Kenosha, Wisconsin--

Signed and Sealed this

Twenty-first Day of March, 1995

Attest:

BRUCE LEHMAN

*Attesting Officer*

*Commissioner of Patents and Trademarks*